United States Patent

Willetts

[15] 3,687,478
[45] Aug. 29, 1972

[54] VEHICLE SUSPENSION SYSTEM

[72] Inventor: Elwood H. Willetts, 102 S. Penataguit Ave., Bay Shore, N.Y. 11706

[22] Filed: March 12, 1971

[21] Appl. No.: 123,581

[52] U.S. Cl. ................ 280/104.5 R, 267/21, 267/63
[51] Int. Cl. ............................................. B60g 5/04
[58] Field of Search ....... 280/104.5, 124.5 A; 267/21, 267/63

[56] References Cited

UNITED STATES PATENTS

| 2,197,727 | 4/1940 | Ledwinka | 267/21 R |
| 897,270 | 9/1908 | Chapin | 267/21 R |
| 2,299,661 | 10/1942 | Symons | 267/63 R |

FOREIGN PATENTS OR APPLICATIONS

| 1,050,691 | 9/1953 | France | 267/21 R |

Primary Examiner—Philip Goodman
Attorney—Darby & Darby

[57] ABSTRACT

A vehicle suspension system having a progressively increasing resistance to deflection, more efficient than prior systems heretofore available is disclosed. The vehicle frame is supported by a pair of oppositely disposed rocker beams having horizontal and vertical components. A plurality of spherically shaped elastomers are supported on a pilot shaft between spherically cupped seats carried by the opposing sides of the rocker beam vertical components. Spacers having spherically cupped faces are positioned between the spherical elastomers on the pilot shaft. Elastomeric bumpers secured to ends of the pilot shaft prevent the rocker beam seats from rebounding outwardly away from the spherical elastomers. This vehicle suspension provides a low frequency deflection ride for the vehicle load over a range of load levels.

5 Claims, 3 Drawing Figures

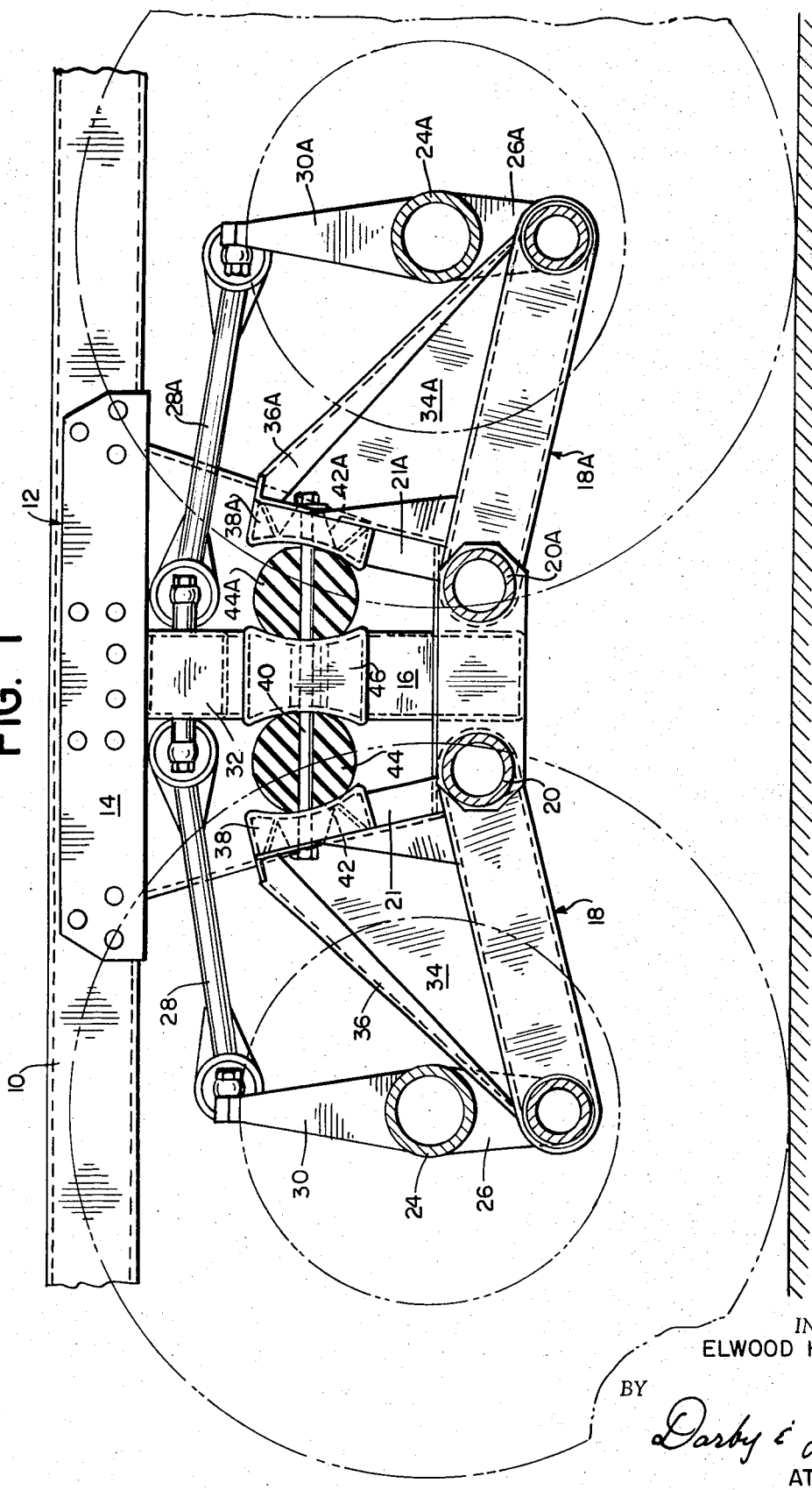

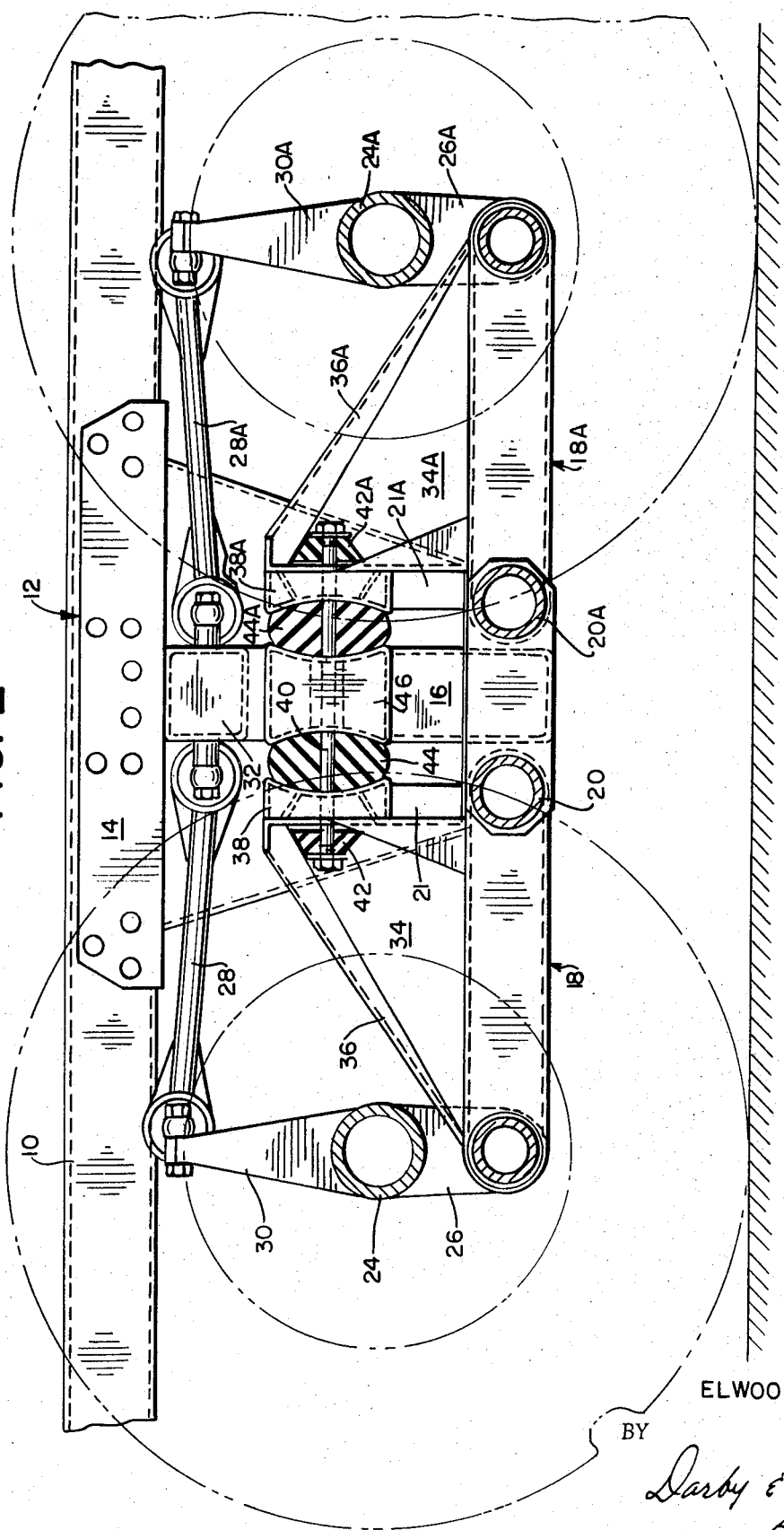

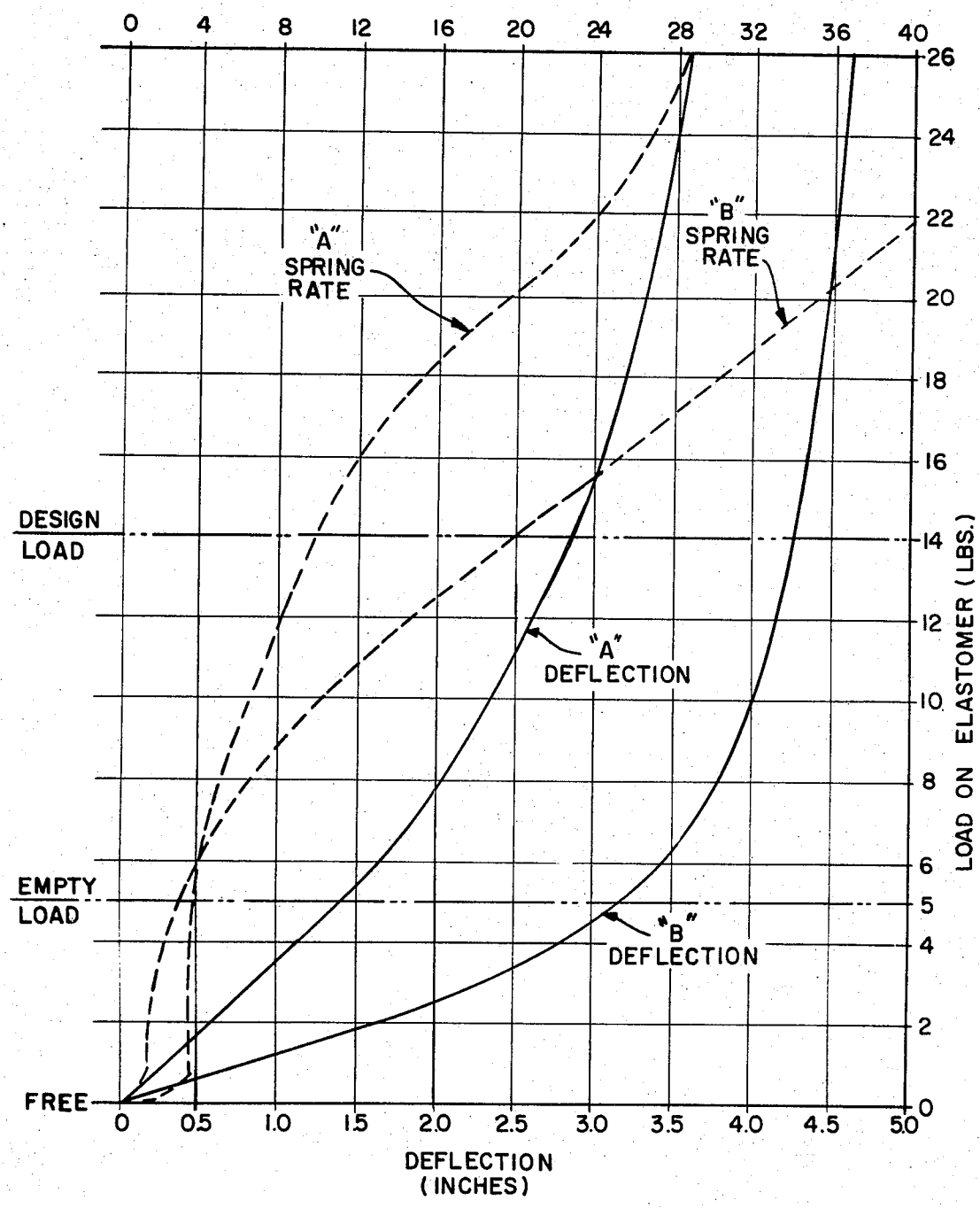

VEHICLE SUSPENSION SYSTEM

The invention described herein is an improvement over the invention described in my U.S. Pat. No. 3,572,745 which issued Mar. 30, 1971. The material disclosed in that patent is hereby incorporated by reference into this disclosure.

This invention generally relates to a suspension system which is adapted for use with single and multiple axle vehicles such as trucks, trailers, bogies, railcars and aircraft.

Generally, there are three categories of load levels: empty load level, design load level and bump load level. At empty load level, the weight of the vehicle is the mass on which the vehicle suspension system operates. At design load level, the suspension system operates on the mass of the vehicle plus the mass of the estimated full load of the vehicle. At bump load level, the suspension system operates on the same mass as at design load level mass with an additional static or dynamic load induced by the design load level mass undergoing a change in direction of travel. The additional static load would be induced when, for example, a fully loaded vehicle encounters a sharp turn.

Since most vehicles generally operate in the three aforementioned modes, it would be advantageous to provide a suspension system which would cushion the vehicle ride by permitting only low frequency deflections in all three modes. In conventional vehicle suspension systems composed of a pair of rocker beams and a damping member between the vertically extending components of the rocker beams, when a dynamic force is induced on a loaded vehicle axle, i.e. when a bump load level condition occurs, the force is transmitted directly to the damping member which is already compressed by the static load on the vehicle. Since the damping member is usually designed so that it exhibits a high resistance to deflection or spring rate at design load level only, the damping member merely transmits the force back through the rocker beam and induces a resonance condition in the vehicle suspension system. This is unacceptable from the standpoint of vehicle suspension wear and comfort of ride. The same conditions result when a vehicle with a conventional suspension system and a damping member designed to provide a high spring rate at design load level only is in the empty load level mode. When the vehicle encounters a bump, there is virtually no deflection of the damping member resulting in a high frequency deflection ride during this mode of operation.

In order to provide a smooth, low frequency deflection ride during all three modes of operation, my U. S. Pat. No. 3,572,745 described a suspension system wherein an elastomeric damping member having a cylindrical center section and spherically convex ends was positioned between a pair of spherically cupped discs or seats attached to the vertically extending componenta of a pair of opposing rocker beams. The combination of the concave seats and the spherically shaped elastomeric members provided a vehicle suspension system which exhibited a progressively increasing resistance to deflection, i.e. a progressively increasing spring rate.

A progressively increasing spring rate makes it possible for a suspension system to have a range of spring rates for different load levels. It is thus possible to have a low spring rate at an empty vehicle load level, a higher spring rate at design load level and a still higher spring rate at bump load level.

Basically, the suspension system of this invention includes a vehicle frame which is supported by a bracket depending downwardly from the frame. The bracket is supported by a pair of rocker beams having horizontal and vertical components. The horizontal components of the rocker beam are supported by a pair of laterally extending vehicle axles by any suitable means. In the preferred embodiment, the horizontal components of the rocker beams are supported in resilient trunnion bushings which are carried by hanger brackets supported by the vehicle axles. Cup shaped seats or discs are attached to the vertically extending components of each rocker beam.

To the extent just described, the suspension system of this invention is the same as the suspension system described in my U. S. Pat. No. 3,572,745. The improvement of this invention resides in providing a plurality of generally spherically shaped elastomers which are arranged in series and compressively restrained between the cup shaped seats. The elastomers are axially spaced apart from each other by spacers having spherically cupped seats. The use of a plurality of spherically shaped elastomeric members, and of the spherically cupped spacers supplements the action of the cupped discs in molding the deflection of the elastomeric members to provide a more efficient progressive increase in the resistive spring rate of the suspended vehicle than was possible with the system described in my U. S. Pat. No. 3,572,745.

Tests conducted on the suspension system disclosed in my U. S. Pat. No. 3,572,745 (System A in the chart below) and the suspension disclosed herein (System B in the chart below) indicated that the latter system exhibited a progressively increasing spring rate of 1,250 lbs./inch of deflection at 1,000 lbs. and of 50,000 lbs/inch of deflection at 26,000 lbs. The system disclosed in my prior patent exhibited a progressively increasing spring rate of 3,580 lbs/inch of deflection at 1,000 lbs. and of 28,000 lbs/inch of deflection at 26,000. Accordingly, the magnitude and range of the spring rate increase in the present system is far superior to that disclosed in my prior system, thereby resulting in a low frequency deflection ride in the three load level modes mentioned above, i.e., empty, design and bump.

The actual weight of elastomeric members used in the system disclosed in my prior patent was 24 lbs. (12 lbs. each). The actual weight of the two pairs of elastomeric members used in my present system is 11 lbs. This results in a saving of 13 lbs. of elastomeric material which is a cost saving of approximately $25.00 or more per vehicle suspension system.

A

| Load in pounds | Total defl. | Increased defl. | Defl. factor | Spring rate lbs/inch defl. |
|---|---|---|---|---|
| 1000 | 0.250 | .250 | .555 | 3580 |
| 2000 | 0.555 | .305 | .585 | 3400 |
| 3000 | .835 | .280 | .550 | 3620 |
| 4000 | 1.105 | .270 | .530 | 3780 |
| 5000 | 1.365 | .260 | .530 | 3780 |
| 6000 | 1.635 | .270 | 500 | 4000 |
| 7000 | 1.865 | .230 | .440 | 4540 |
| 8000 | 2.015 | .210 | .39 | 5130 |

| 9000  | 2.195 | .180 | .34 | 5900  |
| 10000 | 2.355 | .160 | .30 | 6660  |
| 11000 | 2.495 | .140 | .26 | 7700  |
| 12000 | 2.615 | .120 | .24 | 8350  |
| 13000 | 2.735 | .120 | .23 | 8700  |
| 14000 | 2.845 | .110 | .21 | 9550  |
| 15000 | 2.945 | .100 | .18 | 11100 |
| 16000 | 3.025 | .080 | .16 | 12500 |
| 17000 | 3.105 | .080 | .15 | 13300 |
| 18000 | 3.175 | .070 | .13 | 15400 |
| 19000 | 3,235 | .060 | .11 | 18200 |
| 20000 | 3,285 | .050 | .10 | 20000 |
| 26000 | 3.510 | .035 | .07 | 28600 |

B

| Load in pounds | Total defl. | Increased defl. | Defl. factor | Spring rate lbs/ inch defl. |
|---|---|---|---|---|
| 1000  | 0.76 | .76 | 1.6  | 1250  |
| 2000  | 1.60 | .84 | 1.52 | 1315  |
| 3000  | 2.28 | .68 | 1.14 | 1760  |
| 4000  | 2.74 | .46 | .80  | 2500  |
| 5000  | 3.08 | .34 | .64  | 3125  |
| 6000  | 3.38 | .30 | .52  | 3850  |
| 7000  | 3.60 | .22 | .38  | 5260  |
| 8000  | 3.76 | .16 | .30  | 6666  |
| 9000  | 3.90 | .14 | .24  | 8350  |
| 10000 | 4.00 | .10 | .20  | 10000 |
| 11000 | 4.10 | .10 | .16  | 12500 |
| 12000 | 4.16 | .06 | .12  | 16000 |
| 13000 | 4.22 | .06 | .12  | 16000 |
| 14000 | 4.28 | .06 | .10  | 20000 |
| 15000 | 4.32 | .04 | .06  | 33300 |
| 16000 | 9.34 | .02 | .06  | 33300 |
| 17000 | 4.38 | .04 | .08  | 25000 |
| 18000 | 4.42 | .04 | .08  | 25000 |
| 19000 | 4.44 | .02 | .06  | 33300 |
| 20000 | 4.48 | .04 | .04  | 33300 |
| 26000 | 4.60 | .02 | .02  | 50000 |

The measurements tabulated on the above chart are plotted in the graph illustrated in FIG. 3.

A further advantage of the system disclosed herein is that the elastomeric deflection between empty load level and design load level is less in the present system than in the system disclosed in my prior patent. Tests conducted on the two systems indicated that the sprung mass deflection between empty and load levels in the present system was 1.2 inches compared with 1.48 inches in my prior system. Minimum spring mass deflection between empty and design load levels is important to insure that the vertical position of the vehicle does not change substantially during loading and unloading.

The vehicle suspension system described herein is further differentiated from the system described in my U.S. Pat. No. 3,572,745 in that means are provided in the present system to prevent the cup shaped seats from rebounding away from the elastomeric members. This is accomplished by disposing a compression resistant bumper externally of each of the cup shaped seats. The bumpers are supported against the cup shaped discs by a longitudinal pilot member which extends through bumpers and cup shaped discs and through the elastomeric members and spacers intermediate the bumpers and discs.

It is accordingly the primary object of this invention to provide a vehicle suspension system having a progressively increasing resistance to deflection for a progressively increasing load.

It is a further object of this invention to provide a vehicle suspension system in which the spring rate varies over a greater range than in systems heretofore available.

It is a further object of this invention to provide a vehicle suspension system in which the spring rate increases from a lower magnitude at empty load levels to a greater magnitude at bump load levels than in systems heretofore available. It is a further object of this invention to provide a vehicle suspension system which provides a low frequency deflection ride at empty load level, design load level and bump load level conditions.

It is a further object of this invention to provide a vehicle suspension system in which less elastomeric material is used to provide a progressively increasing spring rate than in systems heretofore available.

It is a further object of this invention to provide a vehicle suspension system having a progressively increasing spring rate in which the difference in spring mass deflection between empty and design load levels is less than in systems heretofore available.

Another object of this invention is to provide a vehicle suspension system having a spring rate which progressively exceeds the load increase on the suspension.

Another object of this invention is to provide a vehicle suspension system having an elastomeric assembly composed of a plurality of spherical elastomeric members separated by spherically cupped spacers wherein the elastomeric members are compressed along a horizontal axis as the suspension system proceeds from a no load condition to a bump load condition.

Another object of this invention is to provide a vehicle suspension system composed of a plurality of spherical elastomers separated by spherically cupped spacers wherein the elastomeric members are held captive during rebound from deflection.

These and other objects and features of this invention will be more readily understood and appreciated by reference to the following descriptions and drawings in which:

FIG. 1 is a side elevational view of a tandem axle vehicle suspension system incorporating this invention wherein the system is in a free and/or a rebound condition;

FIG. 2 is a side elevational view of a tandem axle vehicle suspension system incorporating this invention wherein the system is in a design load condition;

FIG. 3 is a graph illustrating the comparative load deflection curves and resulting spring rates between the vehicle suspension system illustrated in my U. S. Pat. No. 3,572,745 (labeled "A") and the system described herein (labeled "B").

Referring now to FIGS. 1 and 2, a vehicle frame 10 is supported by a frame bracket 12 having a horizontal portion 14 which is attached to the vehicle frame and a downwardly depending vertical portion 16. The vehicle frame is supported by a pair of oppositely disposed rocker beams 18 and 18A. The frame bracket 12 is attached to the rocker beams 18 and 18A by trunnions 20, 20A respectively. The rocker beams 18 and 18A have vertically extending members 21 and 21A respectively and horizontally extending members 22 and 22A respectively. The ends of the horizontally extending members of the rocker beams opposite the ends which are trunnioned onto the frame bracket are attached to the vehicle axles 24 and 24A respectively by any suitable means. In the preferred embodiment, the ends of the horizontally extending rocker beam members are trunnioned onto the beam hanger members 26 and 26A respectively, which are in turn integral with axles 24 and 24A respectively. The torque rods 28 and 28A are attached to the torque pillars 30 and 30A respectively. The torque pillars are also integral with the vehicle axle. The opposite ends of the torque rods 28 and 28A are hinged to the frame bracket 12 at the center of the transversely extending portion 32 of the frame bracket.

The rocker beams 18 and 18A have webs 34 and 34A respectively which are transversely centered in the rocker beams so as to connect the horizontal rocker beam portions 18 and 18A respectively with the top chords 36 and 36A which extend downwardly from the top end of the vertically extending portion of the rocker beams to the respective axles, similar to the hypotenuse of a triangle. The chords 36 and 36A have flanges whose width tapers as the chords extend downwardly to the respective axles of the vehicle. The inwardly facing sides of the vertically extending rocker beam members 21 and 21A carry spring seats 38 and 38A which are positioned at the top portions of the vertical members. A pilot shaft 40 extends through each of the seats 38 and 38A and through a hole punched in the web members 34 and 34A. The ends of the pilot shaft 40 which protrude through the respective webs 34 and 34A of the rocker beams are secured thereto by nuts or any other suitable means.

The pilot shaft 40 also extends through bumpers 42 and 42A which are positioned between the web and the spring seat in each of the rocker beams. The purpose of the compression resistance bumpers is to prevent the rocker beam seats 38 and 38A from rebounding outwardly away from the elastomeric members 44 and 44A respectively after deflection. If the vehicle encountered a severe bump condition sufficient to move the wheels of the vehicle off the road, the bumpers would prevent the seats from rebounding outwardly to produce a severe vertical displacement between the frame and the axle. The contact faces of the bumpers 42 and 42A are spherically cupped as are the inwardly facing portions of the spring seats 38 and 38A so as to provide the spring seats with suffient workable contact with the spherically-shaped elastomeric members during the arcuate path of travel of the vertically extending rocker beam members during deflection.

In the preferred embodiment of this invention illustrated in FIGS. 1 and 2, a pair of spherical elastomeric members are supported on pilot shaft 40 between the spherically cupped spring seats 38 and 38A respectively which are mounted on the opposing faces of the rocker beam vertical components. These elastomeric members are held captive between the spring seats by virtue of the secured protruding ends of the pilot shaft. A spherically cupped spacer 46 also supported by the pilot shaft 40 is positioned between the spherical elastomeric members 44 and 44A. The spacer can be made from any compression resistant light material. The pilot shaft 40 extends through the geometric center of the spherical elastomeric members and the spacer 46. In alternate embodiments of the invention not shown but deemed to be within the scope of this invention, a plurality of spherical elastomeric members greater than two can be supported on a pilot shaft between the opposing faces of the rocker beam vertical components with spacers between adjacent elastomeric members.

FIG. 1 illustrates the vehicle suspension system of this invention in a completely free or unladen condition such as would obtain during the assembling of the suspension structure. In this condition, the rebound bumpers 42 and 42A are compressively engaged by the outwardly facing sides of the spring seats 38 and 38A respectively. Also, during this condition, the inwardly facing sides of spring seats 38 and 38A are in point contact with their adjacent spherical elastomeric members 44 and 44A respectively. As load is placed on the vehicle frame, the frame 10 is lowered in relation to the axles 24 and 24A and the spring seats 38 and 38A move toward one another in an arcuate path about their trunnion centers 20 and 20A. Proceeding from the free or no load position illustrated in FIG. 1 to the design load level illustrated in FIG. 2, the opposing spring seats 38 and 38A proceed along an arcuate path in engaging the spherical elastomers. Since the elastomers are being compressively deflected to a greater degree as the spring seats progressively move along their arcuate paths, the diametral or cross-sectional area of the spherical elastomers is progressively increased because the spherically cupped spring seats tend to contain a greater portion of the cross-sectional areas of the elastomers. Simultaneous with the engagement by the spring seats of an increased cross-sectional area of the elastomers is the engagement by the spherically cupped spacers positioned between the elastomers of more of the elastomers' cross-sectional area. Accordingly, a plurality of spherical elastomers arranged in series with spherically shaped spacers between adjacent elastomers causes a direct multiplication of the higher deflection of the elastomers at low level loadings (during which the spring seats and the spacers engage a reduced area of the elastomers) and a progressively increasing resistance to deflection at increasing load levels (during which the area of the elastomers entrapped within the enclosing spring seats and spacers is greater).

Although the spring seats move in an arcuate path during deflection, the elastomeric members are compressed along the horizontal pilot shaft during deflection.

As illustrated in FIG. 2, at design load, the central axis of each of the spring seats is coincidental with the longitudinal axis of the pilot shaft, and the central axes of the elastomeric members and the spacer. This results in maximum elastomeric resistence to deflection at design load.

A wide range of variations in spring rates of the elastomeric assembly including a plurality of spherical elastomers and spherically cupped seats and spacers is available by varying the spherical diameter of the elastomers, by varying the axial length of a basically spherical form of elastomer and by varying the spherical radius of the seats and spacers.

A further advantage of this system is that the service life of a compression resistant elastomeric member is improved wherein its shape enables a most uniform distribution of stress therein, as here obtains with spheres progressively restrained between cupped seats and spacers.

While the principles of the invention have now been made clear in the illustrative embodiment, it will be immediately obvious to those skilled in the art that many modifications in structure, arrangement, proportions, the elements, materials, and components, used in the practice of the invention, and otherwise, which are particularly adapted for specific environments in operating requirements, may be made without departing from those principles. For example, the spherical shapes of the cupped spring seats, the spacers and the captive elastomeric members may be slightly modified without departing from the spirit and scope of this invention. The appended claims are, therefore, intended to cover and embrace any such modifications, within the limits only of the true spirit and scope of the invention.

What is claimed is:

1. A suspension system for a vehicle having a frame upon which a load is supported comprising:
   a first supporting means attached to the vehicle frame,
   a pair of oppositely disposed rocker beam members each being pivotally connected to said first supporting means and having a vertical component, said rocker beam vertical components each having a cupped disc supported at the upper end of said component, said cupped disc being mounted for arcuate movement about the lower end of said component, a plurality of generally spherically shaped elastomeric members being positioned between said cupped discs, a cupped spacer positioned between adjacent elastomeric members, a horizontally disposed shaft extending through said cupped discs, said elastomeric members and each said spacer, said shaft extending through the horizontal axes of said elastomeric members and each said spacer; said cupped discs and each said spacer having radii greater than the radius of said elastomeric members, the diametral area of said elastomeric members being progressively increased during compression of said elastomeric members between said cupped discs and each said spacer, the horizontal axes of said elastomeric members and said spacer remaining coincident with said horizontally disposed shaft during compression of said elastomeric members.

2. A suspension system for a vehicle having a frame upon which a load is supported comprising:
   a first supporting means attached to the vehicle frame,
   a pair of oppositely disposed rocker beam members each being pivotally connected to said first supporting means and having a vertical component, said rocker beam vertical components each having a cupped disc supported at the upper end of said component, a plurality of generally spherically shaped elastomeric members being positioned between said cupped discs, a cupped spacer positioned between adjacent elastomeric members, and an elastomeric bumper member on said rocker beam vertical component which directly engages the rear face of said cupped disc.

3. A vehicle suspension system for providing a progressively increasing spring rate for progressively increasing load levels on the vehicle frame, comprising:
   a first supporting means attached to the vehicle frame,
   a pair of oppositely disposed rocker beam members each being pivotally connected to said first supporting means and each having a vertical component, said vertical components each having a generally spherically shaped cupped disc supported at the upper end of said component, a pilot shaft extending through said cupped discs, a plurality of generally spherically shaped elastomeric members supported on said pilot shaft between said cupped discs and a generally spherically shaped cupped spacer between each of said elastomeric members, and an elastomeric bumper member supported by said shaft and positioned directly adjacent the rear face of said cupped disc.

4. In a vehicle suspension system having a pair of oppositely disposed rocker beam members, the improvement comprising a cupped seat mounted on each of said rocker beam members, a plurality of generally spherically shaped elastomeric members positioned between said cupped seats, a cupped spacer positioned between adjacent elastomeric members, a pilot shaft extending between said cupped seats, said elastomeric members and said spacer being mounted on said shaft, and a bumper member mounted on said shaft and positioned outwardly of said seat.

5. A suspension system for a vehicle having a frame comprising:
   supporting means attached to said vehicle frame;
   a pair of oppositely disposed rocker beam members, each of said rocker beam members having a vertical component, the lower end of each said vertical component being pivotally mounted on said supporting means;
   a pair of cupped discs, each of said cupped discs being non-pivotally secured to the top end of each said vertical component;
   a pair of generally spherically shaped elastomeric members, said elastomeric members being positioned between said cupped discs;
   a spacer positioned between said elastomeric members, said spacer having two cupped surfaces;
   a horizontally disposed shaft extending through said cupped discs, said elastomeric members and said spacer, said shaft being coincident with the horizontal axes of said elastomeric members and said spacer;
   said elastomeric members being compressible between said discs and said spacer, the horizontal axes of said elastomeric members and said spacer remaining coincident with said horizontally disposed shaft during compression of said elastomeric members, the horizontal axis of each of said cupped discs forming an angle with said horizontally disposed shaft prior to compression of said elastomeric members, said angle between said cupped disc horizontal axis and horizontally disposed shaft decreasing during compression of said elastomeric members.

* * * * *